Sept. 27, 1927.  
J. D. PRICE  
ELECTRIC WIRE HOUSING  
Filed Sept. 29, 1925

1,643,725

Inventor  
J D. Price.  
By William C. Linton  
Attorney

Patented Sept. 27, 1927.

1,643,725

UNITED STATES PATENT OFFICE.

JOHN D. PRICE, OF MILWAUKEE, WISCONSIN.

ELECTRIC WIRE HOUSING.

Application filed September 29, 1925. Serial No. 59,435.

This invention relates to improvements in electric wire or "cord" housing devices for lamps of the table, floor, or so-termed "bridge" type, and more particularly, to an electrically operated or connected accessory wherein an electrical conductor of some length is required to supply energy thereto, the invention having for an object to provide a novel form of spring operated reel for receiving and retaining the electric wire of a floor lamp or other energy receiving device and maintaining that portion of such wire connected to an electric supplying source sufficiently taut to keep the same free of knots, bends, or similar objectionable distortions as well as to prevent the entangling of the wire with nearby objects, it being possible with the device to fully extend the wire from the reel, if required, or to only extend a portion thereof, as may be necessary to properly serve those conditions peculiar to its usage.

It is also an object of the invention to provide the device with a novel and advantageous form of reel, the same being of such a construction as to render its manufacture possible without the usage of extensive equipment and thus materially cheapening the cost of production thereof, without in any way affecting the durability or efficiency of the same.

Yet another object of the invention is to provide the reel of the device with a novel and advantageous mounting within the housing or base of a receiving device whereby a fixed and convenient form of support will be afforded the reel and the spring tensioning means thereof will be provided an immovable connection whereby to cause the maintenance of the reel in a normal position, whereat the wire received or coiled thereabout will be fully arranged upon the same.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one embodiment of the same.

In these drawings:—

Figure 1:
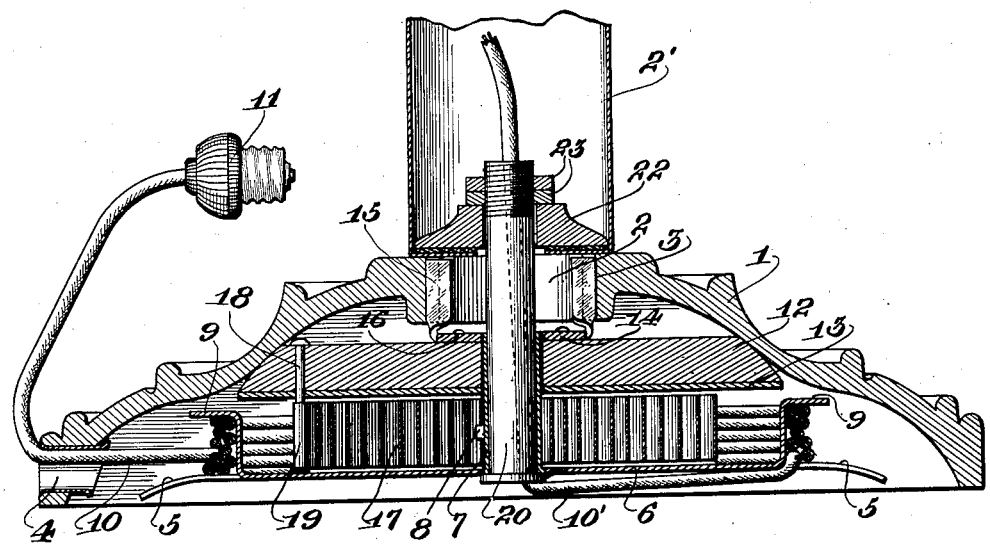
Figure 2:
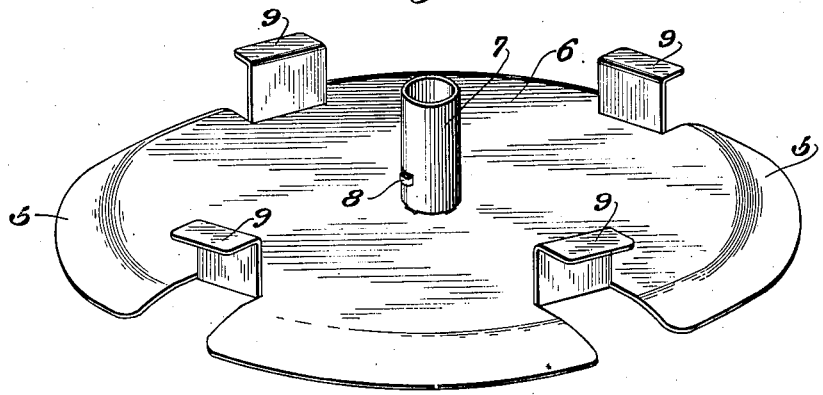

Figure 1 is a vertical section through the lower portion or base of a floor or "bridge" lamp provided with the improved reel; and, Figure 2 is an enlarged detail in perspective of the novel form of reel employed in connection with the device.

Having more particular reference to the drawings, in connection with which like characters of reference will designate corresponding parts throughout, it will be noted in the following description that I have shown, for purposes of illustration, the improved device as being incorporated in the base of a floor or "bridge" lamp. At this time, it is of moment to note, however, that the device may be used in various forms of lamps, and in fact, may be used in connection with any electrically operated device wherein a length of cord or extension of some length is required. In this particular embodiment of the invention, the base of the equipped lamp is generally indicated by the numeral 1, the same being of shell-like formation and providing upon its under side a compartment for receiving the improved reel. An opening is formed in the upper and concentric portion of the base, as indicated by the numeral 2, and the sides of this opening are formed with diametrically opposite vertically disposed slots or ways 3, while a ferrule or outlet sleeve 4 is secured in one side of the base 1 to permit of the passage of the extension electric wire or "cord" therethrough.

The reel comprises a body, preferably circular in configuration, of sheet metal, having the outer portion thereof formed in the shape of an outwardly extending or obliquely disposed flange 5, the body portion of the reel being designated for convenience by the numeral 6. A concentrically disposed bearing sleeve 7 is fixedly secured to the upper side or face of the reel body 6 and has a spring engaging finger 8 struck from or otherwise arranged upon one portion of its peripheral surface, as is clearly shown in the Figure 2.

Right angularly formed fingers, generally indicated by the numeral 9, are struck outwardly or laterally from the body of the reel 6, as is shown in the Figure 2, in directions opposite to the direction in which the obliquely disposed flange 5 extends, the free extremities of these fingers 9 being arranged in substantial parallelism to the adjacent surface or sides of the reel body 6, hence providing an effectual means for receiving an electric wire or "cord" 10 thereabout in coiled fashion, the resulting coil, as shown in the Figure 1, being arranged between the obliquely disposed flange 5 and the free angular portions of the fingers 9, while the outer extremity of said wire 10 is passed through the outlet sleeve 4 whereupon it is provided with a conventional form of screw connection or similar device 11, in order that proper electrical connection may be effected with a source of electrical energy.

With a view towards providing the reel body 6 with means for effectually rotatably mounting the same within the compartment provided therefor upon the under side of the shell-like base 1, a circular wall or head 12 is provided, the marginal portion thereof being bevelled or similarly formed in order that it may be snugly received within said compartment upon the under side of the base 1, as shown in the Figure 1. The lower side of this wall 12 is preferably provided with a metal facing 13, the same being secured thereto in a suitable manner, while concentrically arranged and aligned openings are formed in this wall 12 and facing 13 to permit of the rotatable reception of the bearing sleeve 7, in the manner as shown in the Figure 1.

Secured to the upper face of the circular wall 12 is an apertured disk or plate 14, the opening therein aligning with the opening receiving the bearing sleeve 7 and having the upper extremity of said sleeve extended thereinto. This disk 14 is provided with upstanding arms 15, the upper portions of which are twisted to positions whereby to permit of their arrangement in substantial parallelism to the side walls of the ways 3. Hence, it will be understood that the slidable introduction of these arms 15 into the diametrically opposed ways 3 will be permitted and in this way, it will be understood that the wall 12 will be secured against rotary movement with respect to the housing 1. That is, by reason of the connection of the apertured disk 14 to the adjacent portion of said wall 12 as indicated at 16, and the slidable engagement of the upstanding arms 15 in the diametrically opposed ways 3, said wall 12 will be prevented from having rotary motion with respect to the shell-like base 1.

In order that the rotatably mounted reel 6 will be yieldably retained in normal position, a coil spring 17 is arranged over the upwardly extended and intermediate portion of the bearing sleeve 7, the inner end of such spring being engaged with the finger 8, aforesaid, while the outer extremity thereof is fixedly connected to the nonrotatable wall 12 through the medium of a bolt 18 passing through an adjacent portion of said wall and its facing 13 and through a bearing sleeve 19 formed in said adjacent or outer end of the spring 17. It will be thus appreciated that with rotation of the reel 6 in one direction, the spring 17 will be tensioned to such an extent that with release of said reel, the same will immediately return under influence of the tensioned coil spring to its normal position, and by recoiling the wire 10 upon the reel and effecting its arrangement with respect to such reel, as is indicated in the Figure 1.

To maintain the various parts of the device in assembled relation, a flanged pipe 20 is employed. This bolt is passed upwardly through the reel 6 and its bearing sleeve 7, the apertured disk 14 and through an opening formed in the lower end of the lamp supporting column or post 21, whereupon a flanged washer or similar device 22 is engaged therewith, following which locking and jam nuts 23 are turned into engagement with the screw threaded extremities. By proper adjustment of the locking and jam nuts 23 upon the screw threaded extremity of the pipe 20, it will be understood that the non-rotatable wall 12 and the rotatable reel 6 will be secured against vertical displacement with respect to the shell-like base 1.

To permit of conduction of electrical energy to the electric lamps proper of the equipped lamp, the inner end of the wire 10 may be and preferably is extended from the reel 6 in the fashion as indicated by the numeral 10', upwardly through the longitudinal opening formed in the pipe 20 and into and through the hollow column 21 of the lamp from whence it is suitably connected to the receiving devices of the equipped lamp.

From the fore-going, it will be understood that in usage of a lamp provided with my improved reel, any desired length of wire 10 may be extended from the base 1 thereof, such as conditions or preference may dictate and such extended portion of the wire may be maintained sufficiently taut to prevent its entanglement with adjacent objects, and likewise, to prevent bending or similar distortion thereof. When the cord is disconnected from the source of electrical energy, the same will be completely returned or recoiled upon the reel 6 which will be rotated to its normal position under influence of the tensioned coil spring 17 hereinbefore described.

Manifestly, the construction shown is capable of considerable modification, and such modification as is within the scope of my claims, I consider within the spirit of my invention.

I claim:—

1. In combination, a lamp base, a wire receiving pipe mounted therein, and a reel rotatable on said pipe in position to receive the wire from the pipe and pass same toward an opening in said base.

2. A device of the character described comprising housing means, a wall received within said housing means, said housing means having diametrically opposed vertical ways formed in a portion of the same, a disk carried by said wall formed with right angularly disposed arms slidably receivable in said ways whereby to prevent rotation of the wall, a reel rotatably mounted upon the wall within the housing, and spring means engaging said reel and a portion of said wall for yieldably and movably retaining the reel in its normal position.

3. A device of the character described comprising housing means having diametrically opposed vertically disposed ways formed in a portion thereof, a wall received within said housing means, a plate secured to one side of said wall and formed with right angularly disposed arms adapted to be slidably engaged in said ways whereby to prevent rotation of said wall with respect to the housing means, a reel consisting of a single piece of material having a flange bent obliquely and outwardly from and about the outer portion thereof and right angularly formed fingers struck from said outer portion and in a direction opposite to the direction of said flange, said flange and fingers being adapted to receive and coil a length of material thereabout, a bearing sleeve arranged concentrically of said reel and disposed at right angles thereto, the lower end of said sleeve opening onto the lower surface of the reel, said wall having an opening formed therein for receiving the upper portion of the sleeve therethrough, a supporting column arranged upon the upper portion of said housing means having an opening formed in the adjacent end thereof, a connecting bolt passing through said plate and the sleeve thereupon upwardly through the opening in the adjacent end of the column and into the same, locking means engaged with the bolt for interconnecting said reel, wall, housing means, and column, and a coiled spring arranged about the bearing sleeve having the inner end thereof connected to such sleeve and the outer end of the same connected to a portion of said wall for yieldably and movably retaining the reel in its normal position.

4. In combination, an open bottom base, a wire receiving pipe, and a reel rotatably mounted thereon, said pipe and reel mounted to be removed as a unit through the bottom of said base.

5. In combination, an open bottom base, a wire receiving pipe, and a reel rotatably mounted thereon, said pipe and reel mounted to be removed as a unit through the bottom of said base, and spring means for the reel loosely connected to the base and detached therefrom in the removal of the pipe and reel from the base.

6. In combination with the base and wire receiving pipe of a lamp, a spring operated reel rotatably mounted on the pipe and having a portion locked to said base upon the mounting of said pipe in the base.

7. In combination with the base and wire receiving pipe of a lamp, a reel rotatably mounted on the pipe, a coil spring having one end secured to said reel and means cooperating with said pipe for attaching the other end of the spring to said base.

8. In combination with the base and wire receiving pipe of a lamp, a reel rotatably mounted on the pipe, a coil spring having one end secured to said reel, means for attaching the other end of the spring to said base and means including said pipe for forcing said means in a direction to bring about a locking engagement with said base.

9. In combination with the base and wire receiving pipe of a lamp, a reel mounted on the pipe, a spring having one end secured to the reel, a plate mounted on said pipe and secured to the other end of said spring with a portion having a sliding interlocking engagement with said base and nuts on said pipe engaging said base to draw said pipe in a direction to force said plate into engagement with the base.

10. In combination, a lamp base, a reel, a wire receiving pipe supporting said reel at its axis of rotation, a spring having one end secured to the reel, a plate having a detachable sliding connection with said base and connected to the other end of the spring, said plate in its assembled position bearing upon the interior surface of said base and nuts on said pipe exerting pressure on exterior of said base.

In witness whereof I have hereunto set my hand.

JOHN D. PRICE.